United States Patent [19]

Leitermann

[11] Patent Number: 5,111,900
[45] Date of Patent: May 12, 1992

[54] MOTOR VEHICLE

[75] Inventor: Wulf Leitermann, Bad Wimpfen, Fed. Rep. of Germany

[73] Assignee: Audi AG, Neckarsulm, Fed. Rep. of Germany

[21] Appl. No.: 573,031
[22] PCT Filed: Feb. 2, 1989
[86] PCT No.: PCT/EP89/00095
    § 371 Date: Aug. 3, 1990
    § 102(e) Date: Aug. 3, 1990
[87] PCT Pub. No.: WO89/08034
    PCT Pub. Date: Sep. 8, 1989

[30] Foreign Application Priority Data

Feb. 24, 1988 [DE] Fed. Rep. of Germany ....... 3805711

[51] Int. Cl.$^5$ ............................................ B60K 15/035
[52] U.S. Cl. .................................. 180/69.4; 55/385.3; 123/519; 280/834
[58] Field of Search ....................... 280/834; 180/69.4; 123/519; 55/385.3

[56] References Cited

U.S. PATENT DOCUMENTS 4,793,839 12/1988 Hayashida et al. ................ 280/834

FOREIGN PATENT DOCUMENTS

| 3346103 | 7/1985 | Fed. Rep. of Germany . |
| 1033383 | 7/1953 | France ................................ 280/834 |
| 1250283 | 11/1960 | France . |
| 0077156 | 5/1983 | Japan ................................ 123/519 |
| 0191427 | 8/1986 | Japan ................................ 180/69.4 |
| 0053224 | 3/1987 | Japan ................................ 280/834 |

Primary Examiner—David M. Mitchell
Attorney, Agent, or Firm—Kane, Dalsimer, Sullivan, Kurucz, Levy, Eisele & Richard

[57] ABSTRACT

In a motor vehicle driven by an internal combustion engine (1), the fuel vapors escaping from the fuel tank during filling are trapped in a can (6). The can is accommodated in a recess in the base of the spare wheel container. In this way, a comparatively large can may be accommodated without the need for extra space.

2 Claims, 2 Drawing Sheets

MOTOR VEHICLE

Regulations of law provide that fuel vapors may not be released from the fuel tank into the atmosphere. To fulfill this requirement these fuel vapors are fed through a so-called canister, which generally contains active charcoal as filter material, to the air intake system of the internal combustion engine. This filter primarily traps the fuel vapors developing while the vehicle is standing still, and is regenerated by the fact that, during operation, air is aspirated from the atmosphere through the filter. This involves relatively small amounts. Difficulty is encountered in satisfying the requirement that the fuel vapors displaced from the fuel tank when it is filled be intercepted, since their volume is relatively great and necessitates a correspondingly large canister in order effectively to prevent the emission of fuel vapors into the atmosphere. The accommodation of a large canister causes considerable problems on account of the extreme space limitations in the engine compartment.

The invention is addressed to the problem of creating a motor vehicle of the generic kind in which even a large canister can be accommodated without difficulty.

In the case of the proposal according to the invention, the normally unused space inside of the spare wheel is used to contain the canister. Since the wheel size depends on the engine size, and motor vehicles with powerful engines have larger and/or wider wheels, there is a relationship between the size of the space available for the canister and the engine size, which in turn affects the size of the fuel tank, so that it is possible to dispose in the recess accommodating the spare wheel a canister adapted to the size of the fuel tank.

By the proposal according to the invention the additional advantage is obtained that the canister is situated in the vehicle at a point which is very well protected in the case of an accident. In the conventional arrangement of the canister in the engine compartment, it can happen, especially in the event of a front-end collision, that the canister may burst and fuel may land on the hot exhaust system and ignite.

If the recess for the spare wheel is in the bottom of the trunk compartment, an annular gap open at the bottom is formed between the circumferential wall of the canister and the circumferential wall of the space accommodating the canister, and it is in communication with the interior of the canister through one or more openings in its top side, while the connecting line for the fuel vapors opens downwardly into the canister, so that, when tanking up, the displaced air laden with fuel vapors flows upward through the canister yielding the fuel to the filter material. Vice versa, when the engine is running, air is aspirated downward through the filter and the fuel stored in the filter is entrained by it.

The changeover between trapping the fuel vapors and regenerating the active charcoal filter is performed by means of a servo valve with three connections of which the first connection is connected with the fuel tank, the second with the air intake system of the internal combustion engine and the third with the canister. The valve body is held by a spring in a first position wherein the first connection is connected with the second connection and the third connection is stopped. When tanking, the valve body is brought to a second position in which the first connection is connected to the third connection and the second connection is stopped. The movement of the valve body to its second position can be brought about by a vacuum control or by an electromagnet by means of a switch when is closed when the tank cap is removed or when the pump nozzle is inserted.

An embodiment of the invention will be described herewith in conjunction with the drawings, wherein.

Figure 1:
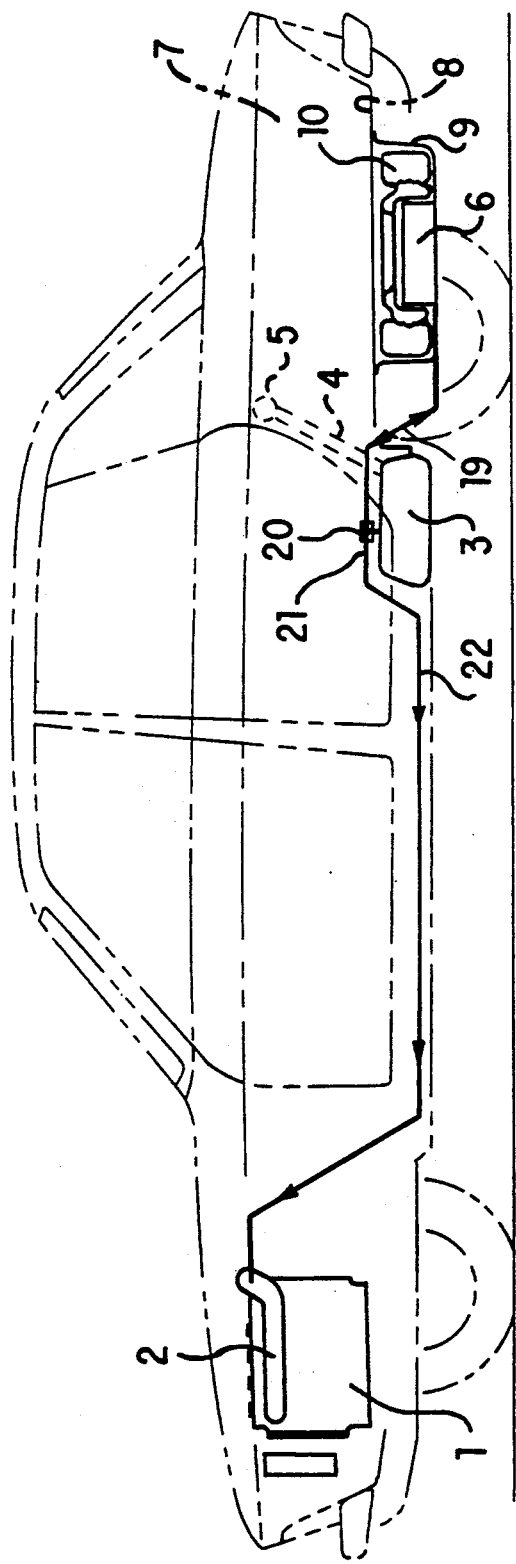
FIG. 1 is a diagrammatic side view of a motor vehichle.

The motor vehicle represented in FIG. 1 is powered by an internal combustion engine 1 with an air intake system 2. 3 identifies the fuel tank, which has a filling spout 4 with a tank cap 5.

The motor vehicle is equipped with an apparatus for trapping fuel vapors escaping from the fuel tank 3 while it is being filled. This apparatus has a canister 6 with an active carbon filter, whose one end is connected with the atmosphere and whose other end is in communication with the fuel tank 3 while it is being filled, and otherwise with the air intake system 2 of the internal combustion engine 1.

Figure 2:
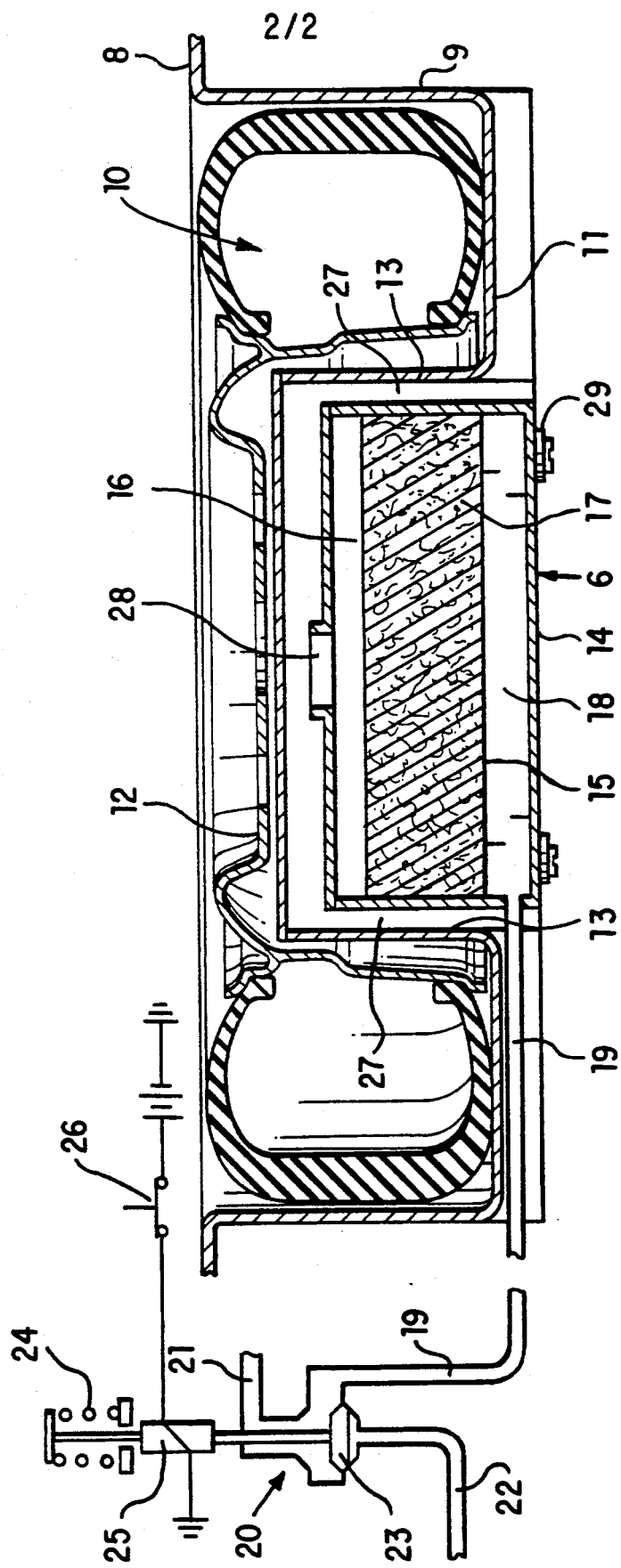
FIG. 2 is a section in the area of the trunk compartment for accommodating the spare wheel, showing in detail the arrangement of the canister.

The motor vehicle 1 has a trunk compartment 7 in whose bottom a recess 9 is provided to accommodate a spare wheel 10. The bottom 11 of the recess 9 is pressed upward in the area of the web 12 of the spare wheel, forming a pot 13 in which the canister 6 is disposed, as represented in detail in FIG. 2. The canister 6 has a disk-shaped housing 14 which contains a layer of active carbon filter material 17 between perforated plates 15 and 16. The space 18 underneath the filter layer 17 communicates with a tube 19 which can be connected alternately by a servo valve 20 to a vent tube 21 connected to the fuel tank 3 or to a vaccum line 22 leading to the air intake system 2 of the internal combustion engine. The servo valve 20 has a valve body 23 which in this embodiment can be brought by a spring 24 to a first position and by an electromagnet 25 to a second position. In the circuit of the electromagnet 25 there is provided a switch 26 which is automatically closed while tanking is in progress, for example by the removal of the fuel tank cap 5 or by the insertion of the pump spout into the filling tube 4. The switch 26 is shown in the closed position, so that the electromagnet 25 pushes the valve body 23 downward and blocks line 22 and produces a connection between lines 19 and 21. Accordingly, the air charged with fuel vapors which is displaced when the fuel tank 3 is being filled passes through lines 21 and 19 to the canister 6. The housing 14 of the canister 6 defines, with the circumferential wall of the pot 13, an annular gap 27 which communicates through an opening 28 with the area above the filter 17. The displaced air flows through the filter 17, there yields the fuel, and passes through the annular gap 27 into the open. When the filling has ended, the switch 26 opens and spring 24 can bring the valve body 23 into its second position in which line 21 is stopped and lines 1 and 22 are connected to one another. With the motor 1 running, air is then aspirated through the filter 17 thereby regenerating the filter.

Instead of an electromagnet 25, any other servo device can be used, such as a vacuum actuator in whose vacuum line a valve operated by switch 26 is provided.

The canister 6 is bolted through lugs 29 to the bottom 11 of the compartment 9.

I claim:

1. A motor vehicle powered by an internal combustion engine with a fuel tank comprising:
   a filling tube with a tank cap,
   an apparatus for trapping vapors escaping from the fuel tank while said tank is being filled, said apparatus having a canister that is in communication with the atmosphere and is brought into communication alternately with the fuel tank and with the air intake system of the internal combustion engine; and,
   a trunk compartment with a recess for accommodating a spare wheel with a web, wherein a bottom of the recess is drawing upwardly in the area of the web of the spare wheel to form a pot having a circumferential wall;
   wherein the canister is disposed at least partially in said pot and,
   wherein an annular gap open at the bottom is formed between a peripheral wall of the canister and the circumferential wall of the pot, said gap being in communication with the interior of the canister through at least one opening in the top of the canister.

2. The motor vehicle according to claim 1 further comprising:
   a servo valve with three connections, including a first connection connected to the fuel tank, a second connection connected to the air intake system of the internal combustion engine, and a third connection connected to the bottom of the canister;
   said servo valve comprising a valve body held by a spring in a first position in which the second connection is connected to the third connection and the first connection is closed, and further comprising means for moving said valve body during filling of said tank into a second position in which the first connection is connected to the third connection and the second connection is closed, said means being activated by removing the tank cap or by inserting a fuel spout into the filling tube.

* * * * *